US010015616B2

(12) United States Patent
Luo et al.

(10) Patent No.: US 10,015,616 B2
(45) Date of Patent: Jul. 3, 2018

(54) SPARSE DECOMPOSITION OF HEAD RELATED IMPULSE RESPONSES WITH APPLICATIONS TO SPATIAL AUDIO RENDERING

(71) Applicant: UNIVERSITY OF MARLYLAND, COLLEGE PARK, College Park, MD (US)

(72) Inventors: Yuancheng Luo, College Park, MD (US); Ramani Duraiswami, Highland, MD (US); Dmitry N. Zotkin, Greenbelt, MD (US)

(73) Assignee: University of Maryland, College Park, College Park, MD (US)

( * ) Notice: Subject to any disclaimer, the term of this patent is extended or adjusted under 35 U.S.C. 154(b) by 215 days.

(21) Appl. No.: 14/732,864

(22) Filed: Jun. 8, 2015

(65) Prior Publication Data

US 2015/0358755 A1 Dec. 10, 2015

Related U.S. Application Data

(60) Provisional application No. 62/008,754, filed on Jun. 6, 2014.

(51) Int. Cl.
*G06F 17/10* (2006.01)
*H04S 7/00* (2006.01)
*H04S 5/00* (2006.01)

(52) U.S. Cl.
CPC ................ *H04S 7/302* (2013.01); *H04S 5/00* (2013.01); *H04S 2420/01* (2013.01)

(58) Field of Classification Search
CPC ....................................................... H04S 7/302
(Continued)

(56) References Cited

U.S. PATENT DOCUMENTS 7,085,393 B1 * 8/2006 Chen ....................... H04S 1/007 381/1
2005/0280519 A1 * 12/2005 Nagata ..................... B60Q 5/00 340/435
(Continued)

OTHER PUBLICATIONS

D. R. Begault, "3D Sound for Virtual Reality and Multimedia", Academic Press, Cambridge, MA, 1994, Chapter One, Virtual Auditory Space: Context, Acoustics, and Psychoacoustics, 19 pp.
(Continued)

*Primary Examiner* — Tan V. Mai
(74) *Attorney, Agent, or Firm* — Foley & Lardner LLP

(57) ABSTRACT

This application describes methods of signal processing and spatial audio synthesis. One such method includes accepting an auditory signal and generating an impression of auditory virtual reality by processing the auditory signal to impute a spatial characteristic on it via convolution with a plurality of head-related impulse responses. The processing is performed in a series of steps, the steps including: performing a first convolution of an auditory signal with a characteristic-independent, mixed-sign filter and performing a second convolution of the result of first convolution with a characteristic-dependent, sparse, non-negative filter. In some described methods, the first convolution can be pre-computed and the second convolution can be performed in real-time, thereby resulting in a reduction of computational complexity in said methods of signal processing and spatial audio synthesis.

7 Claims, 11 Drawing Sheets

(58) Field of Classification Search
USPC .................................................. 708/300–323
See application file for complete search history.

(56) References Cited

U.S. PATENT DOCUMENTS

2011/0135098 A1* 6/2011 Kuhr ...................... H04S 3/004 381/17
2011/0170721 A1* 7/2011 Dickins .................. H04S 7/306 381/309

OTHER PUBLICATIONS

Cheng, Corey I., et al.; Introduction to Head-Related Transfer Functions (HRTF's): Representations of HRTF's in Time, Frequency, and Space, Audio Engineering Society Convention 107, 1999, 28 pp.
Zotkin, Dmitry N., et al.; "Rendering Localized Spatial Audio in a Virtual Auditory Space"; IEEE Transactions on Multimedia, vol. 6, pp. 553-564, 2004, 29 pp.
Batteau, D.W.; "The Role of the Pinna in Human Localization", Proceedings of the Royal Society of London. Series B, Biological Sciences, vol. 168, No. 1011 (Aug. 15, 1967), pp. 158-180, Accessed: May 12, 2015, 24 pp.
Satarzadeh, Patrick et al.,; "Physical and Filter Pinna Models Based on Anthropometry", Audio Engineering Society Convention Paper, Presented at the 122nd Convention, May 5, 2007, Vienna, Austria, 20 pp.
Geronazzo, Michele, et al.; "Estimation and Modeling of Pinna-Related Transfer Functions", Proc. of the 13th Int. Conference on Digital Audio Effects (DAFx-10), Graz, Austria, Sep. 6, 2010, 8 pp.
Raykar, Vikas C. et al.; "Extracting the Frequencies of the Pinna Spectral Notches in Measured Head Related Impulse Responses", Journal of Acoustical Society of America, vol. 118 Jul. 2005, pp. 364-374, 11 pp.
Ding, Chris, et al.; "Convex and Semi-Nonnegative Matrix Factorizations", IEEE Transactions on Pattern Analysis and Machine Intelligence, vol. 32, No. 1, 2010, 26 pp.
Cooley, James W., et al.; "An Algorithm for the Machine Calculation of Complex Fourier Series", Mathematics of Computation, vol. 19, No. 90, Aug. 17, 1964, pp. 297-301, 5 pp.
Johnson, Steven G., et al.; "A Modified Split-Radix FFT With Fewer Arithmetic Operations", IEEE Transactions on Signal Processing vol. 55, No. 1, pp. 111-119 (2007), 9 pp.
Algazi, V.R., et al.; "The Cipic HRTF Database", Oct. 21, 2001, New Paltz, New York, IEEE Workshop on Applications of Signal Processing to Audio and Acoustics 2001, pp. 99-102, 4 pp.
Gardner, Bill, et al.; "HRTF Measurements of a KEMAR Dummy-Head Microphone", MIT Media Lab Perceptual Computing—Technical Report #280, May 1994, The Journal of the Acoustical Society of America, vol. 97, p. 3907, 7 pp.
Gupta, Navarun, et al.; "HRTF Database at FIU DSP Lab", IEEE International Conference on Acoustics Speech and Signal Processing (ICASSP) 2010, pp. 169-172, 4 pp.
Warusfel, O.; "Listen HRTF Database", online, IRCAM and AK, Available: http://recherche.ircam.fr/equipes/salles/listen/index.html, 2003.
Jeub, Marco, et al.; "A Binaural Room Impulse Response Database for the Evaluation of Dereverberation Algorithms", 16th International Conference on Digital Signal Processing, 2009, pp. 1-5, 5 pp.
Lee, Daniel D., et al.; "Algorithms for Non-negative Matrix Factorization", Advances in neural information processing systems, vol. 13, pp. 556-562, 2001, 7 pp.
Ding, Chris, et al.; "On the Equivalence of Nonnegative Matrix Factorization and Spectral Clustering", in SDM, vol. 5, 2005, pp. 606-610, 5 pp.
Shaw, E.A.; "Acoustical Features of the Human External Ear", Binaural and Spatial Hearing in Real and Virtual Environments, Lawrence Erlbaum Associates, 1997, Chapter 2, pp. 25-47.
Lawson, C., and Hanson, R.; "Solving Least Squares Problems" Linear Inequality Constraints, Prentice-Hall, 1987, Chapter 23, pp. 160-165, 6 pp.
Kim, Seung-Jean, et al.; "An Interior-Point Method for Large-Scale λ1-Regularized Least Squares", IEEE Journal of Selected Topics in Signal Processing, vol. 1, No. 4, Dec. 2007, pp. 606-617, 12 pp.

* cited by examiner

SPARSE DECOMPOSITION OF HEAD RELATED IMPULSE RESPONSES WITH APPLICATIONS TO SPATIAL AUDIO RENDERING

CROSS REFERENCE TO RELATED APPLICATIONS

This application claims priority to U.S. Provisional Application Ser. No. 62/008,754 filed Jun. 6, 2014 which is incorporated herein by reference in its entirety.

BACKGROUND

In order to create an improved experience during the use of virtual reality (VR), an auditory virtual reality (AVR) can be created by replicating sound scattering that would occur as a sound source interacts both with a simulated representation of a physical environment and with the specific anatomy of the listener, including the listeners head, ears, and torso.

To understand a sound landscape, it is possible to measure the changes that sound undergoes as it interacts with the physical environment and the listener, as shown in the prior art, using a Head-Related Transfer Function (HRTF) that is specific to the listener. Various means for obtaining listener-specific HRTFs are shown in prior art FIGS. 1 and 2.

In FIG. 1, a source (speaker) is placed at a given location and a generated sound is then recorded using a microphone placed in the ear canal of an individual. In order to obtain the HRTF corresponding to a different source location, the speaker is moved to that location and the measurement is repeated. HRTF measurements from thousands of points are needed and the process is time-consuming, tedious, and burdensome to the listener.

In FIG. 2, a transmitter is located within the ear of the individual and a plurality of pressure wave sensors (microphones) are arranged in a microphone array surrounding the individual's head. The sound emanating from the transmitter is collected at the microphones in the form of pressure waves which are analyzed to extract the HRTF. To pinpoint the location of the sensors in reference to the transmitter, a microphone and head tracking system is attached to the individual's head to monitor position.

A Head-Related Impulse Response (HRIR) filter is a listener-dependent and direction-dependent filter which can be derived from the inverse Fourier transform of the HRTF. Knowledge of the HRIR filter is useful because it can be applied to additional sound sources which have not been measured in order to understand the reaction of these sound sources to the listener and the environment via a convolution operation.

Since the computational cost of the convolution operation depends on the size of the HRIR filter, identifying a sparse HRIR filter representation will allow efficient, zero-latency processing in a time domain as an alternative to the albeit low complexity but latency-laden processing using fast Fourier transforms (FFT) in the frequency domain.

SUMMARY

Methods of signal processing and spatial audio synthesis are disclosed.

In one example implementation, a method of signal processing is disclosed. The method includes accepting a physical signal having a characteristic indicative of a physical property in a first state and processing the physical signal to effect a transformation of the physical signal from the first state to a second state by applying a representation of a base filter to the physical signal. The representation of the base filter is a convolution of a plurality of shorter filters.

In another example implementation, a method of spatial audio synthesis is disclosed. The method includes approximately decomposing a plurality of impulse responses each characterized by a spatial characteristic into a convolution of a characteristic-independent first filter and a characteristic-dependent second filter; accepting an auditory signal; and generating an impression of an auditory virtual reality by processing the auditory signal to impute the spatial characteristics on the auditory signal via convolution with the plurality of impulse responses. The processing is performed in a series of steps, the steps including: performing a first convolution of the auditory signal with the first filter and performing a second convolution between the result of the first convolution and the second filter.

In another example implementation, a computing device is disclosed. The computing device includes one or more processors for controlling operations of the computing device and a memory for storing data and program instructions used by the one or more processors. The one or more processors are configured to execute instructions stored in the memory to: approximately decompose a plurality of impulse responses each characterized by a spatial characteristic into a convolution of a characteristic-independent first filter and a characteristic-dependent second filter; accept an auditory signal; and generate an impression of an auditory virtual reality by processing the auditory signal to impute the spatial characteristics on the auditory signal via convolution with the plurality of impulse responses. The processing is performed in a series of steps, the steps including: precomputing a first convolution of the auditory signal with the first filter and performing, in real time, a second convolution between the result of the first convolution and the second filter.

BRIEF DESCRIPTION OF THE DRAWINGS

The description makes reference to the accompanying drawings wherein.

DETAILED DESCRIPTION

A structured decomposition of HRIRs based on an extension to a non-negative matrix factorization algorithm is disclosed. The HRIR is re-expressed as a convolution between a direction-independent filter which is correlated with anthropometry and a direction-dependent filter where sparsity can be tuned at a slight cost to the HRIR reconstruction error. These filters can be applied to time-domain convolution with arbitrary source-signals at a rate much faster than convolution via a FFT. A simplified representation of the HRIR filter may also support prediction of changes to the HRIR filter based on a particular listener's anthropometry without obtaining measurements. Further, this same technique can be applied to simplify the representations of other types of impulse responses.

Figure 1:
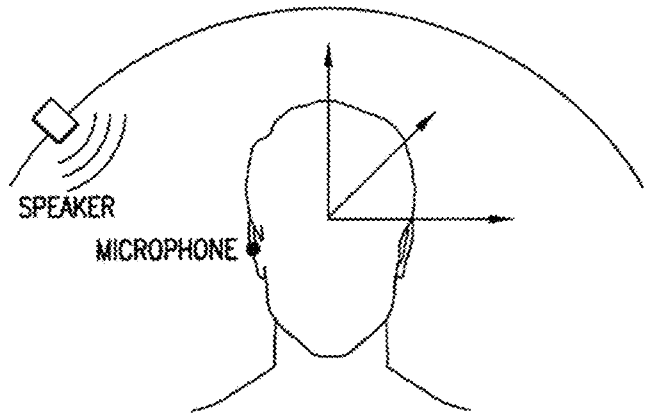
FIG. 1 PRIOR ART
FIG. 1 is a schematic of an exemplary arrangement of HRTF measurement according to the prior art.
Figure 2:
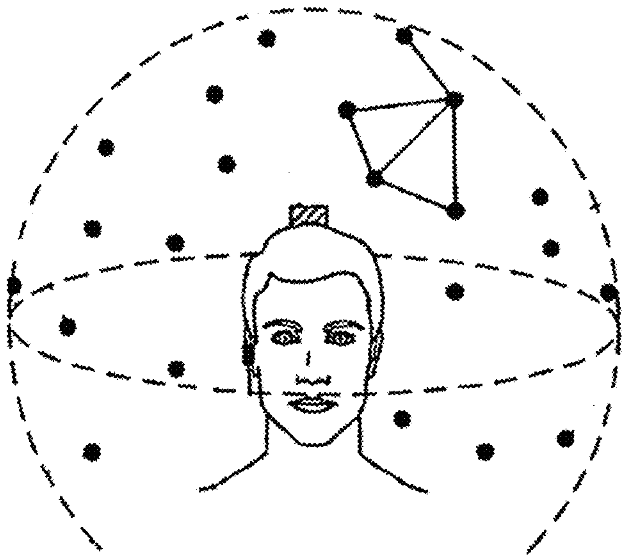
FIG. 2 PRIOR ART
FIG. 2 is a schematic of another exemplary arrangement of HRTF measurement according to the prior art.
Figure 3:
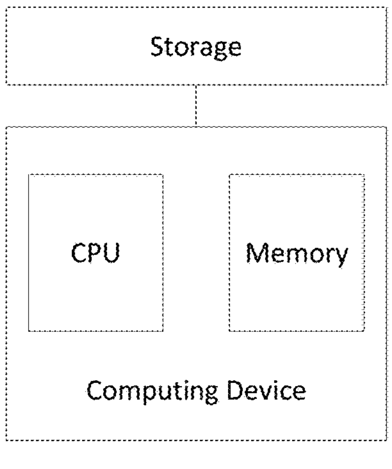
FIG. 3 is a block diagram of a computing device.

FIG. 3 is a block diagram of a computing device, for example, for use in signal processing and spatial audio synthesis as described here. The computing device can be any type or form of single computing device or can be composed of multiple computing devices. The processing unit in the computing device can be a conventional central processing unit (CPU) or any other type of device, or multiple devices, capable of manipulating or processing information. A memory in the computing device can be a random access memory device (RAM) or any other suitable type of storage device. The memory can include data that is accessed by the CPU, using, for example, a bus.

The computing device can also include secondary, additional, or external storage, for example, a memory card, flash drive, or any other form of computer readable medium. Applications installed within the computing device can be stored in whole or in part in the memory or in the external storage and then loaded into the memory as needed for processing. The applications installed within the computing device can include those configured for signal processing and spatial audio synthesis as described in more detail below.

Introduction

HRTFs represent spectral characteristics of a subject's anthropometry (head, torso, outer-ear or pinna). Recent works on pinna-related transfer functions (PRTFs) (pinna contribution to the HRTF) have led to re-synthesis models based on the decomposition into ear-resonance and ear-reflection parts. A PRTF can thus be expressed as a convolution between a resonance component derived from the spectral envelope and a reflection component derived from estimated notches in amplitude.

This disclosure addresses a similar decomposition formulation for a collection of HRIRs with two added constraints. Suppose an HRIR x is expressed as the time-domain convolution:

$$x=f*g,\ g\geq 0. \qquad [1]$$

Equation 1 includes "resonance filter" f shared by all HRIRs belonging to a subject and a sparse non-negative "reflection filter" g unique to the measurement direction. The resonance filter f is assumed direction-independent, mixed-signed, and can be interpreted as the averaged response over all anthropometry. The filter g is assumed direction-dependent, non-negative, and inclusive of values that are interpreted as instant reflections in time. The length of g is typically short as only the early reflections are modeled; f is conversely long due to sound scattering distances over the head. Moreover, jointly learning filters f and g is a well-posed problem using a modified semi-non-negative matrix factorization (semi-NMF) method.

Figure 4:
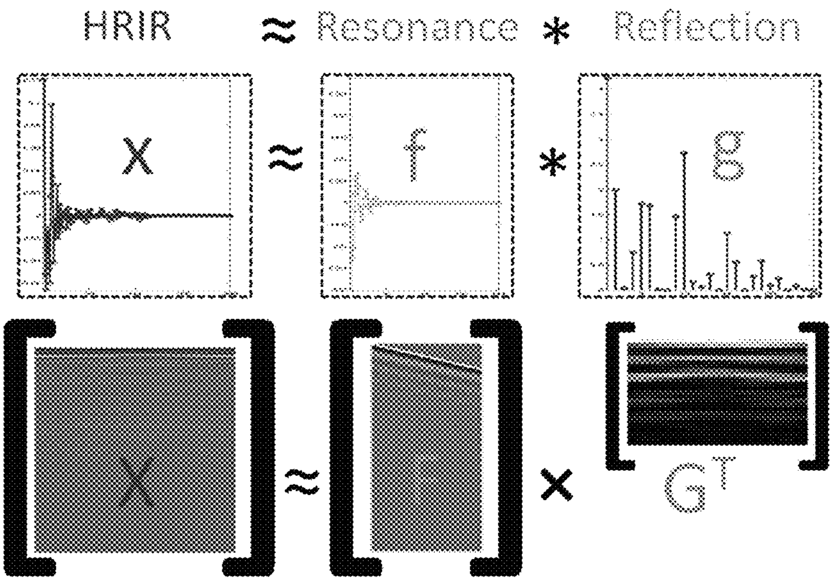
FIG. 4 is a representation of semi-non-negative matrix factorization generalizing time-domain convolution.

As shown in FIG. 4, semi-NMF approximately factorizes a mixed-signed matrix X into a mixed-signed matrix F and non-negative matrix G where $X\approx FG^T$ is optimal in the least-squares sense. This disclosure modifies the factorization so that the matrix F has a Toeplitz structure where the convolution operation is equivalent to a formulation of Toeplitz matrix-vector multiplication. The HRIRs, arranged as columns of the input matrix X, are obtained as a matrix-vector product of the Toeplitz matrix F characterized by the resonance filter f, and the reflection filters g arranged as the rows of matrix G.

This Toeplitz constrained semi-NMF of HRIR x allows for efficient convolution with an arbitrary source-signal y via the associative and commutative property:

$$y*x=(y*f)*g=(y*g)*f \qquad [2]$$

For a known source-signal y the convolution (y*f) is direction-independent and can be stored with little overhead costs. During run-time, the direct convolution with a sparse reflection filter g (or multiple sparse filters in G) is fast. Conversely for a streaming source-signal y of small block-sizes, multiple convolutions with different g in y*g is fast during run-time as the remaining convolution with the longer resonance filter f occurs only once.

Figure 5:
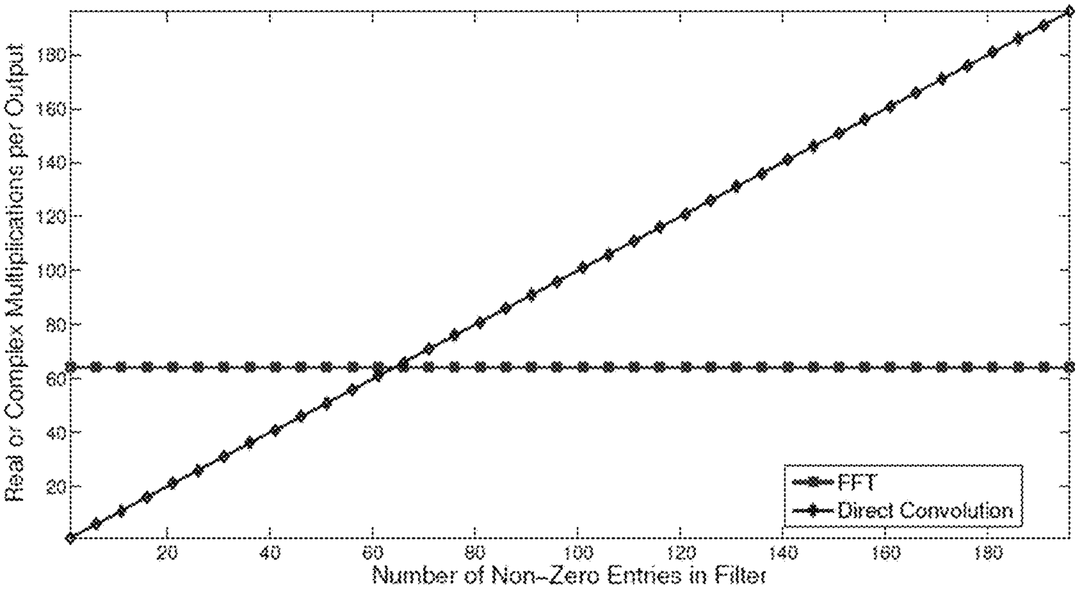
FIG. 5 is a comparison of the number of operations between a FFT and direct convolution of a physical signal.

As shown in FIG. 5, direct-convolution between long and short signals generally requires fewer operations than convolution via the FFT. The theoretical cost analysis between direct and FFT-based convolutions gives an approximate cross-over point at filter length K=68 where theoretical floating point multiplications (FPMs) of direct convolutions grow at a rate K per output compared to FFT implementation at a rate $$\frac{\frac{34}{9}N\log_2 N}{N+K}$$

for sample size N=3×44100.

The sparsity of reflection filters in G can be tuned by solving a regularized ($L_1$ norm penalty) non-negative least squares problem ($L_1$-NNLS). The cost of direct convolution decreases linearly with respect to the number of nonzero entries (NNZs) in the reflection filter g. This presents a trade-off between run-time computational gains of convolution with a sparse g and the loss of quality in the HRIR reconstructed from g. The reconstruction errors are expressed by the root-mean square error (RMSE) and spectral distortion (SD) with respect to the reference HRIR/HRTF given by:

$$\mathrm{RMSE} = \sqrt{\frac{\|X - \tilde{F}G^T\|_F^2}{MN}}, \tag{3}$$

$$SD(H^{\{j\}}, H^{\{*j\}}) = \sqrt{\frac{1}{M}\sum_{i=1}^{M}\left(20\log_{10}\frac{|H_i^{\{j\}}|}{|H_i^{*j}|}\right)^2}.$$

The SD is the sum of component magnitude ratios between the Fourier transform of a reference HRIR (HRTF) $H^{\{j\}}=F\{X_j\}$ and the reconstruction $H^{\{*j\}}=F\{FG_J^T\}$ which can be interpreted as a perceptual distance in the frequency domain. All factorizations are separately done on HRIRs that share the same ear and subject identity. All HRIRs can be pre-processed as taken from subjects in the Center for Image Processing and Integrated Computing (CIPIC) database, though HRIRs belonging to other subjects and from other databases are also possible. The methods described below can be generalized to any large collection of IRs (e.g. room IRs) for which a similar decomposition holds.

Semi-Non-Negative Toeplitz Matrix Factorization

The original non-negative matrix factorization (NMF) was introduced in the statistics and machine learning literature as a way to analyze a collection of non-negative inputs X in terms of non-negative matrices F and G where $X \approx FG^T$. The non-negative quantities have seen useful interpretations for spectral clustering of multimedia data such as images and sound spectrograms. As mentioned before, here we hypothesize that they correspond to instantaneous reflections of resonant response on listener's anthropometry. For mixed-signed HRIR inputs, we adopt a related factorization below.

Semi-NMF is a relaxation of the original NMF where the input matrix X and filter matrix F have mixed-signs but the elements of matrix G are constrained to be non-negative. Formally, the input matrix $X \in \mathbb{R}^{M\times N}$ is factorized into matrix $F \in \mathbb{R}^{M\times K}$ and matrix $G \in \mathbb{R}^{N\times K}$ by minimizing the residual Frobenius norm cost function:

$$\min_{F,G}\|X-FG^T\|_F^{\,2}=tr((X-FG^T)^T(X-FG^T)). \tag{4}$$

In equation 4, tr is the trace operator. The RMSE criterion in equation 3 is subsequently minimized at the solutions whereas the SD reconstruction error is not. Described further below, certain transformations of the cost function may decrease the SD error.

The semi-NMF algorithm is as follows: For N samples in data matrix X, the $i^{th}$ sample is given by the M-dimensional row vector $X_i=X_{:,i}$ and is expressed as the matrix-vector product of F and the K-dimensional row vector $G_i=G_{i,:}$. The number of components K is selected beforehand or found via data exploration and is typically much smaller than the input dimension M. The matrices F and G are jointly trained using an iterative updating algorithm that initializes a randomized G and performs successive updates as follows:

$$F \leftarrow XG(G^TG)^{-1},\; G_{ij} \leftarrow G_{ij}\sqrt{\frac{(X^TF)_{ij}^+ + [G(F^TF)^-]_{ij}}{(X^TF)_{ij}^- + [G(F^TF)^+]_{ij}}}, \tag{5}$$

-continued $$(Q)_{ij}^+ = \frac{|Q_{ij}| + Q_{ij}}{2},\; (Q)_{ij}^- = \frac{|Q_{ij}| - Q_{ij}}{2}.$$

The positive definite matrix $G^TG \in \mathbb{R}^{K\times K}$ in equation 5 is small (fast to compute) and the entry-wise multiplicative-updates for G ensure that it retains non-negative entries. The method converges to the optimal solution that satisfies Karush-Kuhn-Tucker conditions as the update to G monotonically decrease the residual in the cost function in equation 4 for a fixed F and the update to F gives the optimal solution to the same cost function for a fixed G. The minimizer of this cost function is not equivalent to that of the SD error but is often a close approximation in practice.

Nearest Toeplitz Minimizer

To modify semi-NMF for learning the resonance and reflection filters, a notation for a related problem is introduced: suppose F is approximated by a Toeplitz-structured matrix $\tilde{F}$ where $\tilde{F}_{ij}=\Theta_{i-j}$ for parameters $\Theta=[\Theta_{1-M}, \ldots, \Theta_{K-1}]^T$; entries along diagonals and sub-diagonals of $\tilde{F}$ constant. The Toeplitz notation is given by the following:

$$\mathrm{Top}(\Theta) = \begin{bmatrix} \Theta_0 & \Theta_1 & \cdots & \Theta_{K-2} & \Theta_{K-1} \\ \Theta_{-1} & \Theta_0 & \Theta_1 & \cdots & \Theta_{K-2} \\ \vdots & \ddots & \ddots & \ddots & \vdots \\ \Theta_{2-M} & \cdots & \Theta_{-1} & \Theta_0 & \Theta_1 \\ \Theta_{1-M} & \Theta_{2-M} & \cdots & \Theta_{-1} & \Theta_0 \end{bmatrix}. \tag{6}$$

This notation is fully specified by parameters $\{\Theta_0, \ldots, \Theta_{K-1}\}$ and $\{\Theta_0, \ldots, \Theta_{1-M}\}$ along the first row and column. One useful form is to represent the Toeplitz matrix as a linear combination of shift matrices $S^k \in \mathbb{R}^{M\times K}$ (ones along the $k^{th}$ sub-diagonal and zero entries otherwise) as given by:

$$\tilde{F}=\Sigma_{k=1-M}^{K-1}S^k\Theta_k, S_{ij}^{\,k}=\delta_{i,j-k}. \tag{7}$$

The nearest Toeplitz matrix approximation of an arbitrary F minimizes the residual Frobenius norm cost function given by:

$$J = \|F - \tilde{F}\|_F^2 = tr(F^TF - 2F^T\tilde{F} + F^T\tilde{F}), \tag{8}$$

$$\frac{\partial J}{\partial \Theta_k} = 2tr\left((F - \tilde{F})^T\frac{\partial \tilde{F}}{\partial \Theta_k}\right),\; \frac{\partial \tilde{F}}{\partial \Theta_k} = S^k$$

In equation 8, the partial derivative of J with respect to a parameter $\Theta_k$ is linear and independent of $\Theta_{j\neq k}$ due to the trace term. By equating the derivatives to zero, the solutions Θ are given by:

$$\Theta_k = \frac{tr(F^TS^k)}{\min(k+M, K-k, K, M)}. \tag{9}$$

Equation 9 is simply the means of the sub-diagonals of the full matrix F. It is thereby possible to obtain an approximate resonance filter from the unconstrained solution to $F=XG(G^TG)^{-1}$ in equation 5 although this would not be the minimizer of the semi-NMF objective function in equation 4.

Unique Toeplitz Minimizer

We define the Toeplitz constrained semi-NMF problem and solution as follows: Suppose F is specified by a Toeplitz matrix given in equations 6 and 7. Then, the cost function in equation 4 is quadratic (convex) with respect to each $\Theta_k$ and the set of parameters $\Theta$ has a unique minimizer. The partial derivatives of the cost function are given by:

$$\frac{\partial\|X-\tilde{F}G^T\|_F^2}{\partial\Theta_k} = \frac{\partial tr\left((X-\tilde{F}G)^T(X-\tilde{F}G^T)\right)}{\partial\Theta_k} = 2tr\left(\left(G^TG\sum_{i=1-K}^{M-1} S^{k^T}S^i\Theta_i\right) - S^{k^T}XG\right). \quad [10]$$

In equation 10, the product of shift matrices $S^{k^T}S^i$ can be expressed as the square shift matrix $\overline{S}^{i-k}$. Unlike the nearest Toeplitz approximation, the partial derivatives of in equation 10 with respect to $\Theta_{1-M\leq k\leq K-1}$ are linearly related to each other. Setting the partial derivatives to zero, the set of parameters $\Theta$ are jointly solved in a second linear equation $A\Theta=b$ defined as follows: $A\in\mathbb{R}^{|\Theta|\times|\Theta|}$, where $|\Theta|=M+K-1$ is a Toeplitz square matrix and $b\in\mathbb{R}^{M\times 1}$ is a vector with entries are given by:

$$A_{M+k,M+i}=tr(G^TG\overline{S}^{i-k}),\ b_{m+k}=tr(S^{k^T}XG). \quad [11]$$

For positive-definite A, the matrix $\tilde{F}$ is parameterized by the solution to the linear system given by:

$$\tilde{F}=\mathrm{Top}(\Theta),\ \Theta=A^{-1}b. \quad [12]$$

Equation 12 is the real and unique minimizer of equation 4. Iterating between equation 12 and computing the multiplicative-update to matrix G via equation 5 gives the optimal solution upon convergence. The overall training process is given in algorithm 1 listed at the end of this detailed description.

Transformed Toeplitz Minimizer

The original cost function in equation 4 can be generalized under linear transformations of the residuals with the aim of finding solutions with lower SD reconstruction errors. The modified semi-NMF problem minimizes a fixed linear transformation $D\in\mathbb{R}^{M^*\times M}$ of the reconstruction error given by:

$$\min_{\tilde{F},G}\|D(X-\tilde{F}G^T)\|_F^2. \quad [13]$$

In equation 13, F and G are subject to the same constraints as before, and $D^TD$ must have full-rank. The solution to $\tilde{F}$ in equation 12 of the modified linear system is given by:

$$A_{M+k,M+i}=tr(G^TGS^{k^T}D^TDS^i),\ b_{M+k}=tr(S^{k^T}D^TDXG). \quad [14]$$

The multiplicative update rule for G is given by $$G_{ij} \leftarrow G_{ij}\sqrt{\frac{(X^T\mathcal{D}^T\mathcal{D}\tilde{F})_{ij}^+ + \left[G\left(\tilde{F}^T\mathcal{D}^T\mathcal{D}\tilde{F}\right)^-\right]_{ij}}{(X^T\mathcal{D}^T\mathcal{D}\tilde{F})_{ij}^- + \left[G\left(\tilde{F}^T\mathcal{D}^T\mathcal{D}\tilde{F}\right)^+\right]_{ij}}}. \quad [15]$$

$\tilde{F}$ and G can be iterated until convergence.

Two common transformations D from signal-processing are considered whose bandwidth parameters $\sigma$ can be tuned. First, the window transform is characterized by the squared exponential filter $$\upsilon_\sigma(x) = e^{-\frac{x^2}{\sigma^2}}$$

and is given by:

$$D_W=\mathrm{diag}(\upsilon_\sigma(0{:}M-1))\in\mathbb{R}^{M\times M}. \quad [16]$$

Equation 16 is the convolution of a signal with an exponential filter in the frequency domain (treated as if it were the time-domain) and is equivalent to element-wise multiplication between time-domain residuals and the squared exponential filter $\upsilon_\sigma(x)$ of inverse bandwidth; early time-bin residuals contribute more to the overall error in equation 13. Conversely, the convolution transform is characterized by the Gaussian filter $$\mathcal{N}_\sigma(x) = \frac{1}{\sigma\sqrt{2\pi}}e^{-\frac{x^2}{2\sigma^2}}$$

and is given by:

$$D_C=\mathrm{Top}(\Theta^C)\in\mathbb{R}^{M\times M},\ \Theta_{1:M-1}{}^C=\mathcal{N}_\sigma(1{:}M-1),\ \Theta_{0:1-M}{}^C=\mathcal{N}_\sigma(0{:}1-M). \quad [17]$$

This is equivalent to element-wise multiplication of the frequency-domain residuals with a Gaussian filter of inverse bandwidth; low-frequency residuals contribute more to the overall error in equation 13.

Resonance and Reflection Filter Training

For the general convolution operation between a resonance and a reflection filter f and g, the native Toeplitz matrix representation of $\tilde{F}$ given in equation 6 must be further constrained to simulate zero-padding the signals which preserves associative and commutative properties. Direct-convolution can be exactly expressed as the constrained Toeplitz matrix-vector product given by:

$$X_i = \begin{bmatrix} \Theta_0 & 0 & \dots & 0 \\ \Theta_{-1} & \Theta_0 & 0 & \dots \\ \vdots & \dots & \ddots & 0 \\ \Theta_{K-M} & \dots & \Theta_{-1} & \Theta_0 \\ 0 & \Theta_{K-M} & \dots & \Theta_{-1} \\ \vdots & \dots & \ddots & \vdots \\ 0 & \dots & 0 & \Theta_{K-M} \end{bmatrix} \begin{bmatrix} G_{i1} \\ \vdots \\ G_{iK} \end{bmatrix}. \quad [18]$$

In equation 18, the parameters $\{\Theta_{K-M-1}, \ldots, \Theta_{1-M}, \Theta_1, \ldots, \Theta_K\}$ are set to constant zero. Only the parameters $\{\Theta_0, \ldots \Theta_{K-M}\}$ are solved for in a smaller $M-K+1\times M-K+1$ sized linear system following equations 11 and 12 and assigned to the resonance filter given by:

$$f=\{\Theta_0, \ldots \Theta_{k-M}\}\in\mathbb{R}^{M-K+1} \quad [19]$$

The resonance and reflection filters are jointly trained in Algorithm 1 for HRIRs (same-ear, same-subjects) for 50 iterations under window transformations $D_W$, $\sigma=\{15, 30, \infty\}$, convolution transform $D_C$, $\sigma=\{0.1, 0.75, 1.0\}$, number of samples N=1250, initial time-bins M=200, and filter length K=25. Note that the identity transform D=I is equivalent to the window convolution case $D_W$, $\sigma=\infty$. Finding an optimal transformation is difficult as the bandwidth parameters $\sigma$ for window and convolution transformations are not easily trained; the cost function is non-linear when both F and G are fixed.

Figure 6:
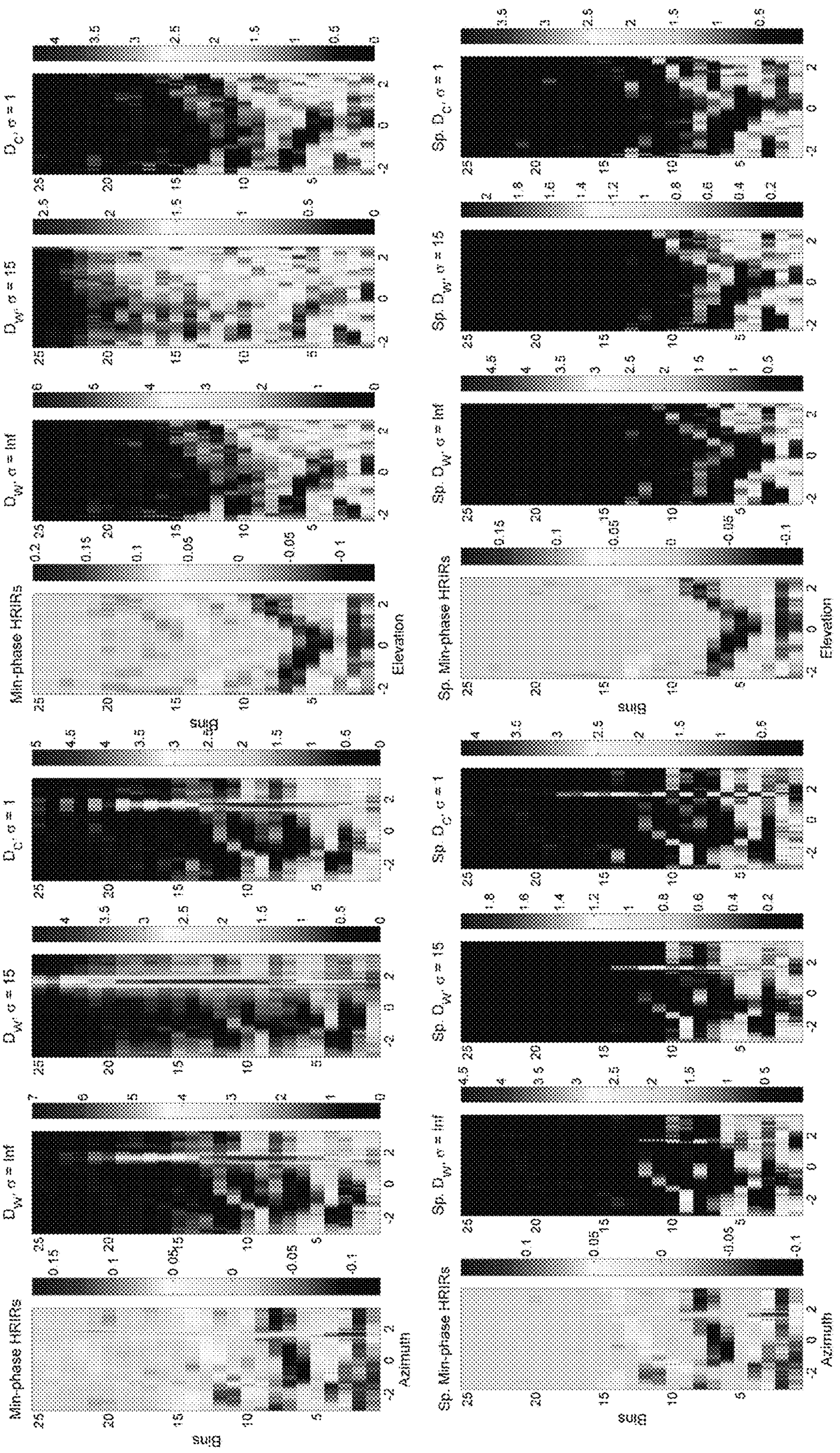
FIG. 6 shows exemplary reflection maps corresponding to horizontal and vertical plane HRIRs (left-ear) trained under various transformations.

As shown in FIG. 6 reflecting experiments with various filter lengths K, most of the signal energy in the min-phase HRIRs is concentrated in the first 25 taps; this corresponds to 0.5625 ms or a rough distance of 19 cm that the sound travels through air after the onset reflection. For K=25 and the identity transform, the early reflections in the HRIRs can be summarized by three to five non-negative bands in the reflections. The later dense reflections along the HRIR tails (beyond 25 taps) are implicitly modeled by the convolution between the early reflections in G and the resonance filter f. The window transform $D_W$ for small σ flattens later time-domain residuals allowing earlier reflections to be more accurately modeled. The convolution transform $D_C$ for large σ flattens high-frequency domain residuals allowing long periodic reflections to be more accurately modeled.

Spectral Filter Analysis

While the resonance and reflection filters are trained in the time-domain, their frequency-domain representations may provide insights to their relationship with anthropometry.

Figure 7:
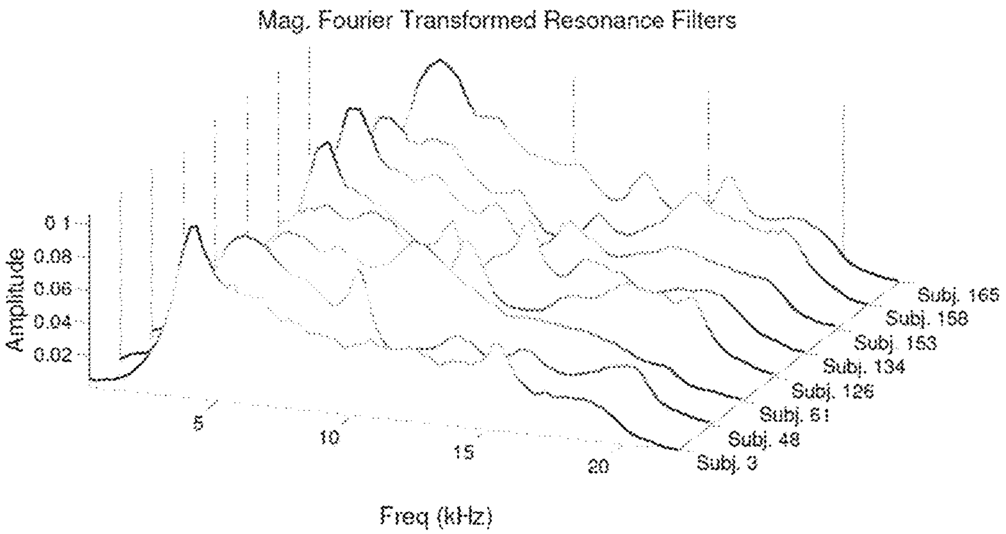
FIG. 7 is a magnitude-frequency representation of resonance filters for CIPIC HRIRs (left-ear)

As shown in FIG. 7, filters trained under the identity transformation D=I include resonance filters f trained on left-ear HRIRs across several CIPIC subjects. These resonance filters f have magnitude-frequency responses the are indistinguishable up to 3 kHz and share resonant frequency centers along the ranges of 4-5, 6.5-7, 9-12, 15-16, and 19-20 kHz. The lowest resonant frequency may correspond with Shaw's omni-directional frequency mode and the higher-frequency centers with individual pinna-related anthropometry.

Figure 8:
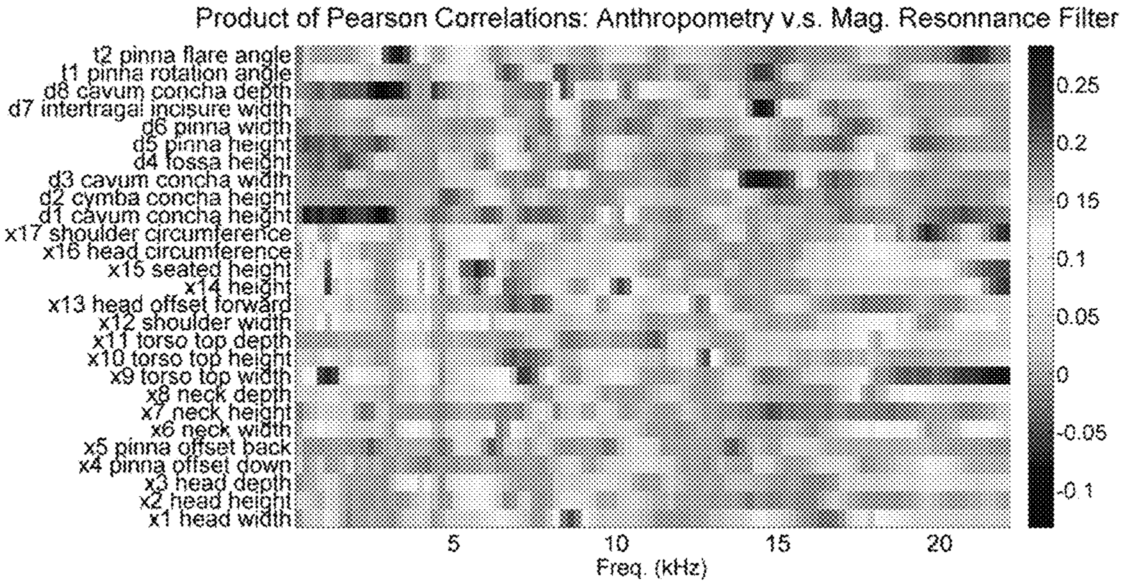
FIG. 8 is a representation of cross-correlation between anthropometry and magnitude-frequency representations of resonance filters for representative CIPIC subjects.

To provide a comprehensive investigation, and as shown in FIG. 8, Pearson-correlations between magnitude-frequency resonance filters f and the anthropometry features across 35 CIPIC subjects are computed. Anthropometry features include both pinna-related (left or right-ear) and non-pinna related features. The left-ear resonance filters are cross-correlated with only the left-ear pinna-related and non-pinna related features. Then, the analogous process is repeated for the right ear. The agreement between the two sets of cross-correlations is computed by taking their product between same-type features. More positive entries implies a high correlation with anthropometry and agreement between ear types. The results show that non-pinna related features $x_{6,9}$ are most correlated to low-frequency resonances at 1-8 kHz, $x_1$,$d_8$ for mid-frequencies 9-11 kHz, and $d_{3,7}$ for higher-frequencies 13-16 kHz. The $t_2$ pinna flare angle is interestingly correlated to the 4 kHz resonance.

Figure 9:
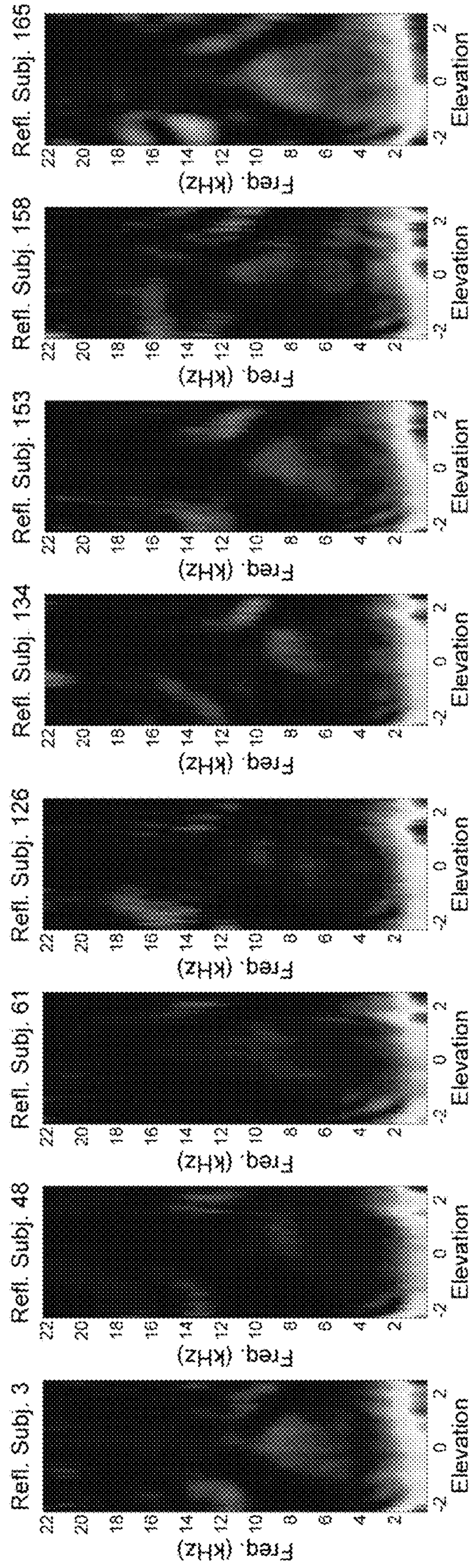
FIG. 9 is a magnitude-frequency representation of reflection filters on a vertical plane.

For completeness, FIG. 9 shows the magnitude-frequency representation of the reflection filters on the vertical plane. The effects of torso and shoulder reflections are captured in the magnitude spike along the low frequency 0-2 kHz range most apparent along low-elevations. Three common notch bands increase in frequency toward higher elevations (top of the head) which agrees with similar observations in the prior art.

Error Analysis

Figure 10:
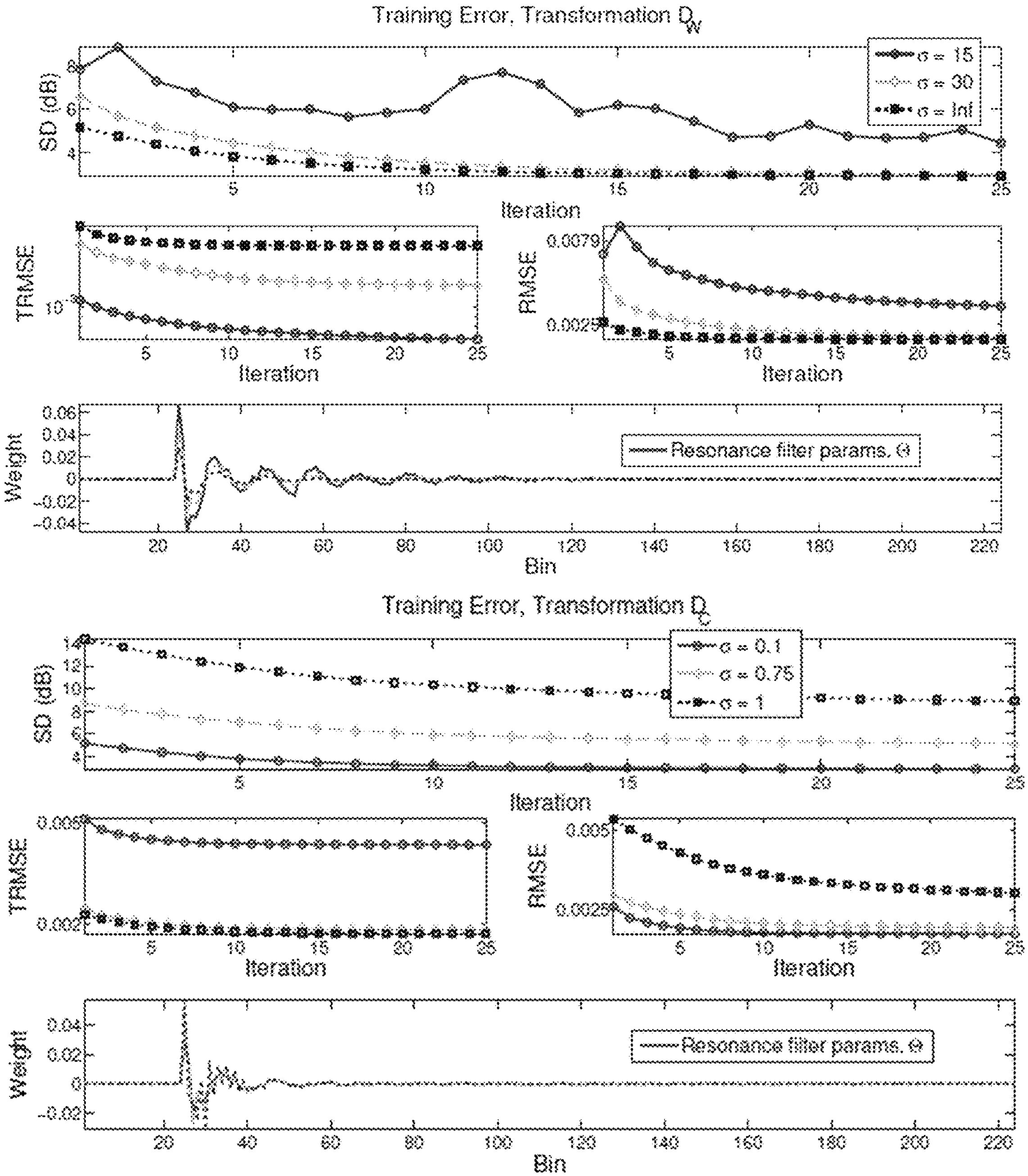
FIG. 10 shows varying reconstruction errors under window and convolution transformations as applied to HRIRs.

FIG. 10 shows varying reconstruction errors under different transformations, that is, under window and convolution transformations of HRIRs. The transformed root mean squared error (TRMSE) is proportional to the cost function in equation 13 and monotonically decreases until convergence. The resonance filters resemble periodic functions that decay in time which is most pronounced in the case of transformation $D_C$,σ=15. For the fixed set of transformations (bandwidths σ), the effects on the trained filters' SD reconstruction error are as follows: the identity transform (window transform $D_W$,σ=∞) achieves the lowest mean SD error of 2.9 dB. Aggressive windowing ($D_W$,σ=15) or smoothing in the frequency domain increases the mean SD error to 4.5 dB. Aggressive convolution or applying a low-pass Gaussian filter ($D_C$,σ=1.0) gives the highest mean SD error of 8.9 dB.

Optimizing Bandwidth σ for Individual HRIRs

While the filters learned under non-identity transformations do not improve upon the mean SD reconstruction error, an alternative approach for improving SD reconstruction errors of individual HRIRs can be considered. For a fixed resonance filter f trained under the identity transformation, one can separately solve for reflections $G_i$ under different transformations ($D_W$, $D_C$ varying σ) of the residuals in a non-negative least squares (NNLS) problem given by:

$$\min_{G_i}\|D(\tilde{F}G_i^T-X_i)\|_2^2, s\cdot t\cdot G_i \geq 0. \qquad [20]$$

Tuning the bandwidth parameter σ for each HRIR $X_i$ produces reflection filters $G_i$ with different SD reconstruction errors. Moreover, the computed reflections can be substituted in place of matrix updates to G in equations 5 and 15 but are computationally more demanding as the substitution requires $O(K^3)$ operations for each of the N reflections. The choice of the bandwidth term σ in the window transform $D_W$ causes a variable amount of smoothing in the frequency domain of the residuals.

Figure 11:
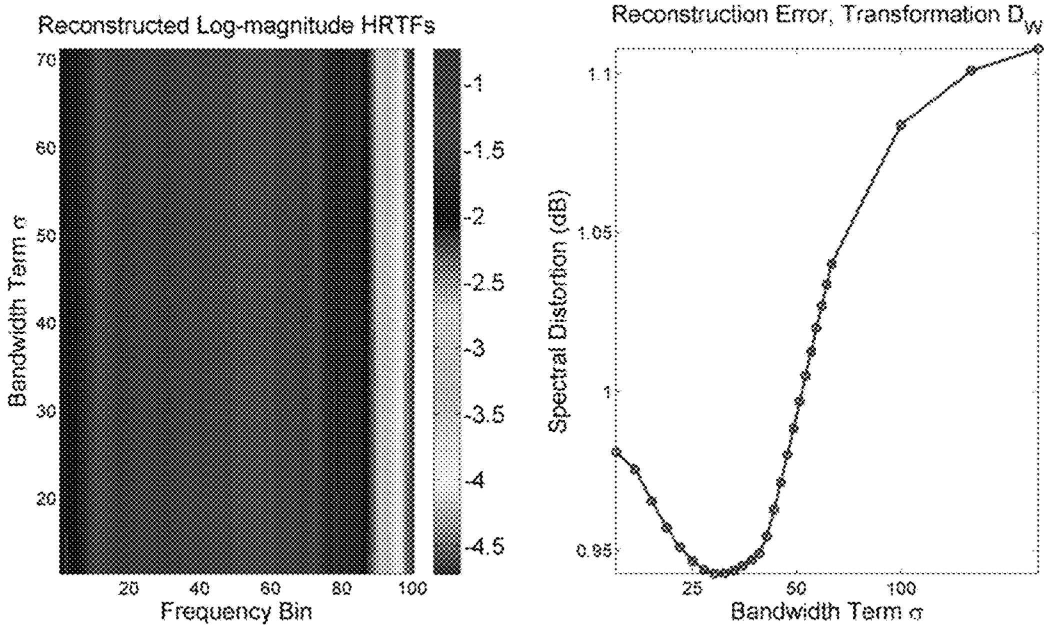
FIG. 11 shows that low-pass filtering of varying bandwidth improves spectral distortion reconstruction error for a sample HRIR.

As shown in FIG. 11, the SD errors, if taken along adjacent frequency bands, are correlated with the smooth magnitude HRTFs in the frequency domain. As bandwidth σ→∞, the NNLS reflections tend toward the original reflections under the identity transformation. However, the actual minimum SD occurs at a finite σ=30 for the sample HRIR.

The choice of the bandwidth term σ in the convolution transform $D_C$ affects the SD reconstruction error in equation 3 along different frequency bands. Consider the restricted SD criterion given by:

$$SD_{M_H}(H^{[j]}, H^{[*j]}) = \sqrt{\frac{1}{M_H}\sum_{i=1}^{M_H}\left(20\log_{10}\frac{|H_i^{[j]}|}{|H_i^{[j*]}|}\right)^2}. \qquad [21]$$

Figure 12:
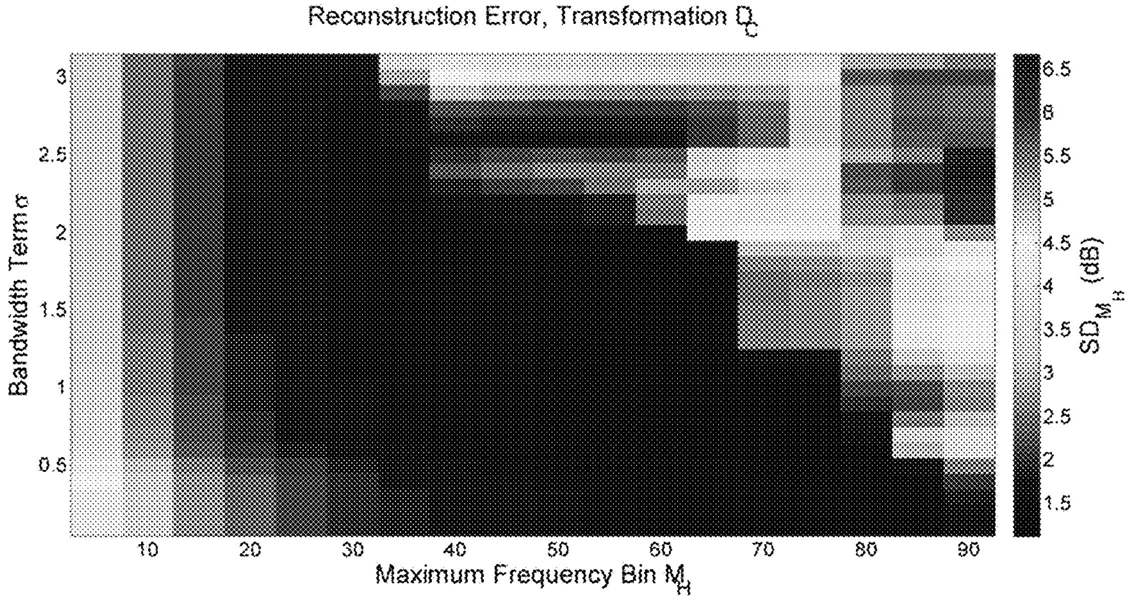
FIG. 12 shows that the lowest-restricted spectral distortion reconstruction error for a maximum frequency bin $M_H$ is inversely related to bandwidth σ for a sample HRIR.

As shown in FIG. 12, the maximum frequency bin $M_H$ in equation 21 is constrained to be $1 \leq M_H \leq M$. For $M_H \leq 80$ (17.64 kHz), the optimal bandwidth term σ is inversely related to the maximum frequency bin $M_H$. Reconstruction errors beyond $M_H > 80$ are more sensitive due to low magnitude of high-frequency residuals; a much wider frequency-domain window bandwidth would be necessary.

Sparse Reflection Reconstruction

To introduce sparsity or to restrict the NNZ entries for reflection filters in G, the trained Toeplitz filter $\tilde{F}$ can be fixed and solved for each reflection filter $G_i$ in a penalized $L_1$-NNLS problem given by:

$$\min_{G_i}\|D(FG_i^T-X_i)\|_2^2+\lambda|G_i|_1, s\cdot t\cdot G_i \geq 0. \qquad [22]$$

The addition of a regularization term λ on the $L_1$ norm of the reflection filter $G_i$ affects the sparsity as increasing λ decreases the NNZ. For the identity transform D=I, the residual norm is directly minimized while penalizing for non-sparsity in the reflection filter $G_i$. It is also practical to discard solution entries that fall below a constant threshold as they contribute little to the overall reconstruction. In a given reflection $G_i$, all entries $G_{ij} \leq 10^{-4}$ are zeroed.

Referring back to FIG. 6, the sparse reflections are illustrated where early reflections of the original HRIRs are shown for horizontal and vertical plane HRIRs. The lower NNZ count in the $L_1$-NNLS solutions sparsifies the non-negative components of the original reflections into distinct bands. Penalizing the $L_1$ norm magnifies the effect of each type of transform as late and non-periodic components are discarded in the window and convolution transforms respectively. The SD reconstruction error to NNZ trade-offs are shown below in Table 1 where the identity transform achieves the expected lowest SD error and loss of accuracy before and after half the nonzero entries are discarded. For vertical-plane HRIRs, SD reconstruction error degrades little for sparser reflections.

TABLE 1

[Mean Spectral Distortion/Number of Nonzero Entries]

| | $D_W$, $\sigma = \infty$ | $D_W$, $\sigma = 15$ | $D_C$, $\sigma = 1.0$ |
|---|---|---|---|
| H-Plane | 3/22.74 | 8.1/24.2 | 4.7/21.4 |
| H-Plane Sparse | 5.3/11.7 | 9.5/9.94 | 6.2/14.72 |
| M-Plane | 8.6/22.5 | 10/23.98 | 8.4/21.04 |
| M-Plane Sparse | 8.6/11.34 | 11/10.02 | 9.3/13.9 |

Optimizing Regularization Term λ for Individual HRIRs

Sparsity reduces the cost of the direct convolution $X_i=f*G_i$ to $O(|\Theta|_0|G_i|_0)$ operations where $|\Theta|_0$ and $|G_i|_0$ are the number of nonzero entries in the filter parameters.

Figure 13:
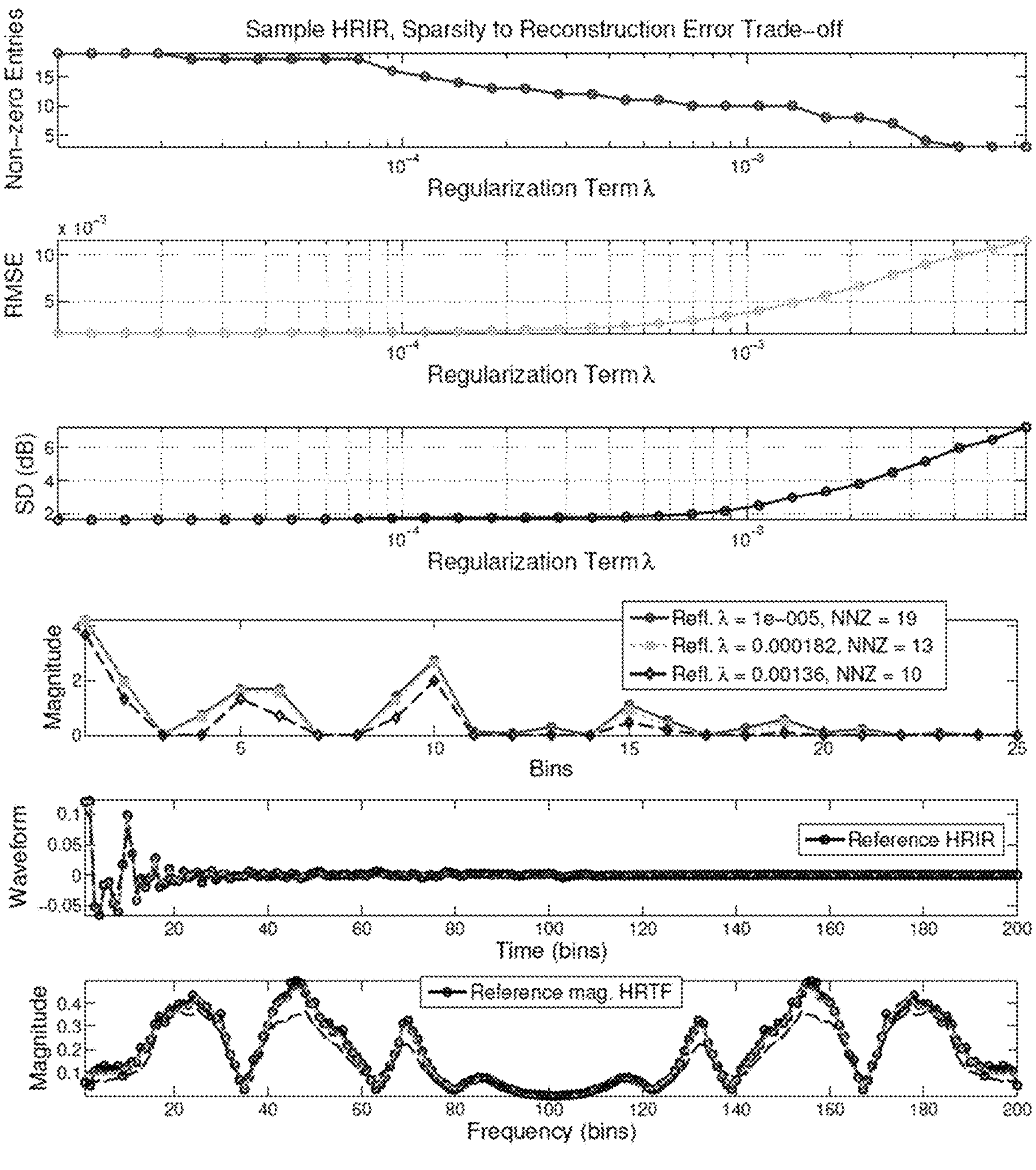
FIG. 13 shows that sample reflections produced by $L_1$-NNLS for varying λ preserve the dominant excitations in the time domain and the shape of the magnitude spectra.

As shown in FIG. 13, by varying the regularization term λ in equation 22, different sparsity and reconstruction errors are achieved: a 4 dB SD with 8 NNZs degrades to 6 dB SD at 4 NNZs.

Figure 14:
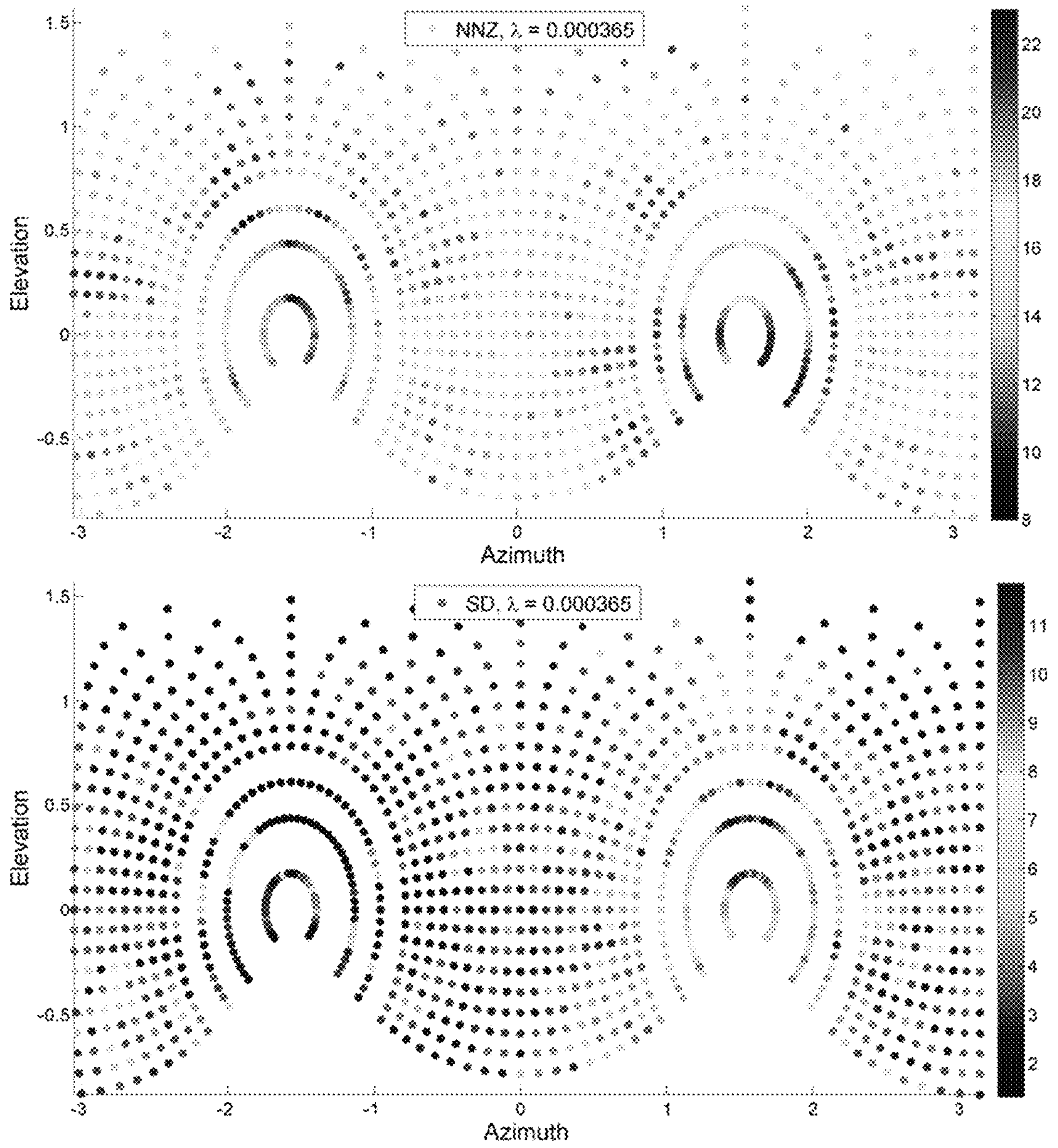
FIG. 14 shows that spectral distortion and the number of nonzero entries is lower (more accurate) for left-ear sparse reflections ($L_1$-NNLS with a constant penalty term λ) near the ipsilateral side of the spherical coordinate grid.

FIG. 14 shows the variability between sparsity and reconstruction error on the full set of HRIRs over the spherical coordinate grid. Variance due to total energy in the HRIRs is accounted for as the HRIRs are normalized in the pre-processing step. Measurements closer to the ipsilateral side of the head achieve lower NNZ. These HRIRs are better summarized by fewer early reflections and obtain the lowest SD errors. Measurements closer to the contralateral side of the head experience distortions along later dense reflections that are not fully accounted for in the model described here.

Comparison with Unconstrained Solutions

One method of empirical validation is to compare our solutions to the unconstrained regularized least squares reconstructions ($L_1$-LS) of HRIR $X_i$ given by:

$$\min_{\hat{x}} \|D(\hat{x}-X_i)\|_2^2+\lambda|G_i|_1. \quad [23]$$

In equation 23, the $\hat{x} \in \mathbb{R}^{M \times 1}$ and the $\hat{x}_j < 10^{-4}$ entries are identically zeroed. Without the non-negative constraints under the identity transform D=I, the solution $\hat{x}$ contains only the large magnitude components $\hat{x} \approx X_i$ (low magnitude components are discarded to induce sparsity). Thus, the $L_1$-NNLS sparse reflections found in equation 22 can be empirically evaluated against the $L_1$-LS reference solutions found in equation 23 in terms of the sparsity and reconstruction errors.

Figure 15:
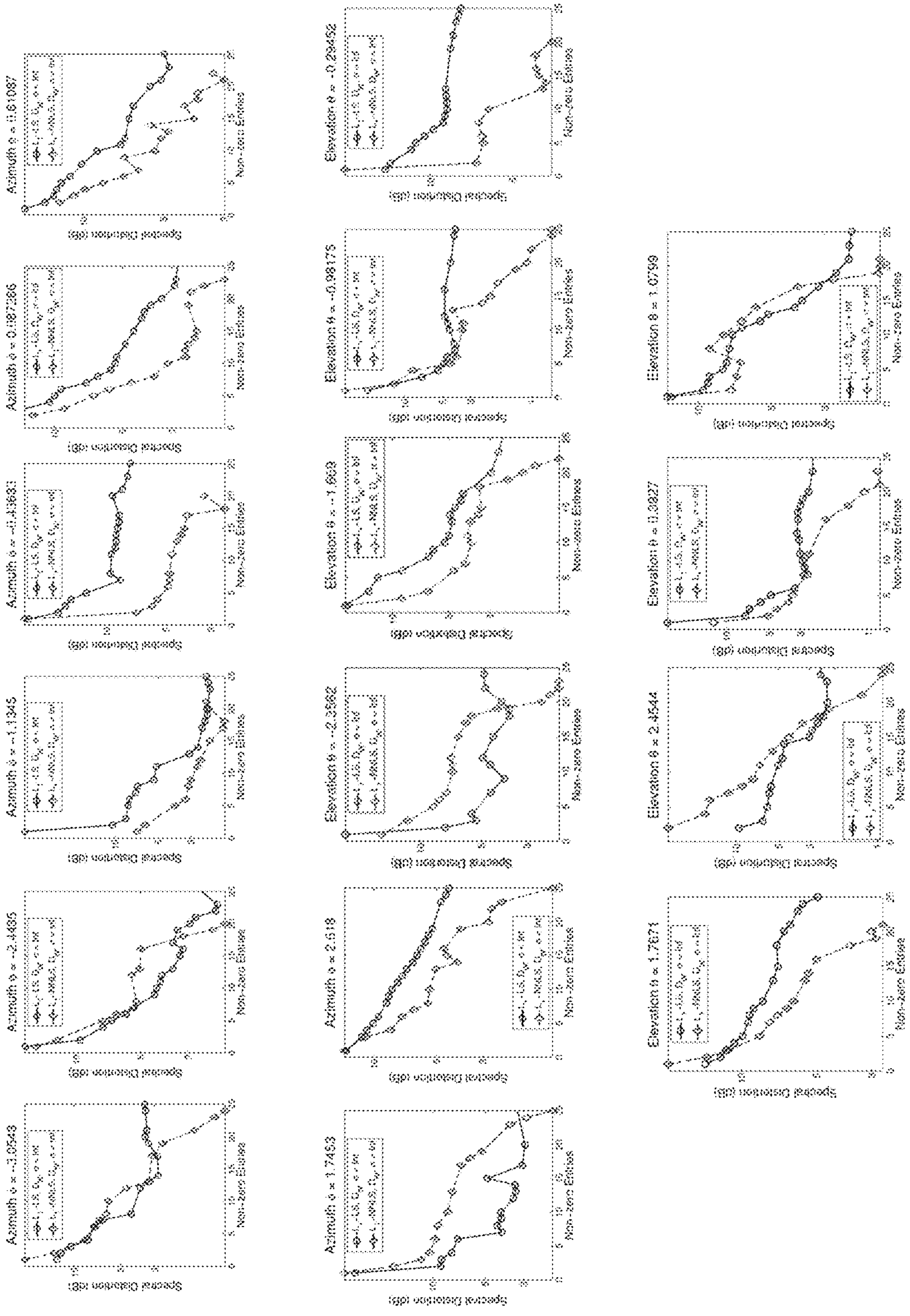
FIG. 15 shows sparsity to spectral distortion reconstruction trade-off for $L_1$-NNLS and $L_1$-LS solutions of varying λ on horizontal and vertical plane HRIRs.

In FIG. 15, for evenly spaced horizontal and vertical plane HRIRs, the two methods are evaluated over a grid of penalty terms λ where the minimum SD reconstruction errors are recorded over the first 25 NNZ bins. For all HRIRs, the $L_1$-NNLS solutions achieve the minimum reconstruction error under 2 dB SD. In half the cases, the $L_1$-NNLS solutions have SD errors strictly less than the $L_1$-LS solutions. This implies that the decomposition described here finds a sparse set of early reflections that explains the spectral characteristics of the HRIR better than the dominant magnitude components of the original HRIR.

In practice, the penalty term λ for each HRIR can be independently tuned via a binary search for a target sparsity and reconstruction error range. The target NNZ is device dependent and can be optimized for a sparsity range such that direct convolution is faster than the FFT implementation; digital signal processors perform efficient direct convolution via hardware delay-lines. The target reconstruction error can depend on the desired fidelity of spatialization; multiple low-magnitude reverberations from sound scattering off of distant geometry in the environment may be coarsely modeled.

CONCLUSION

Figure 16:
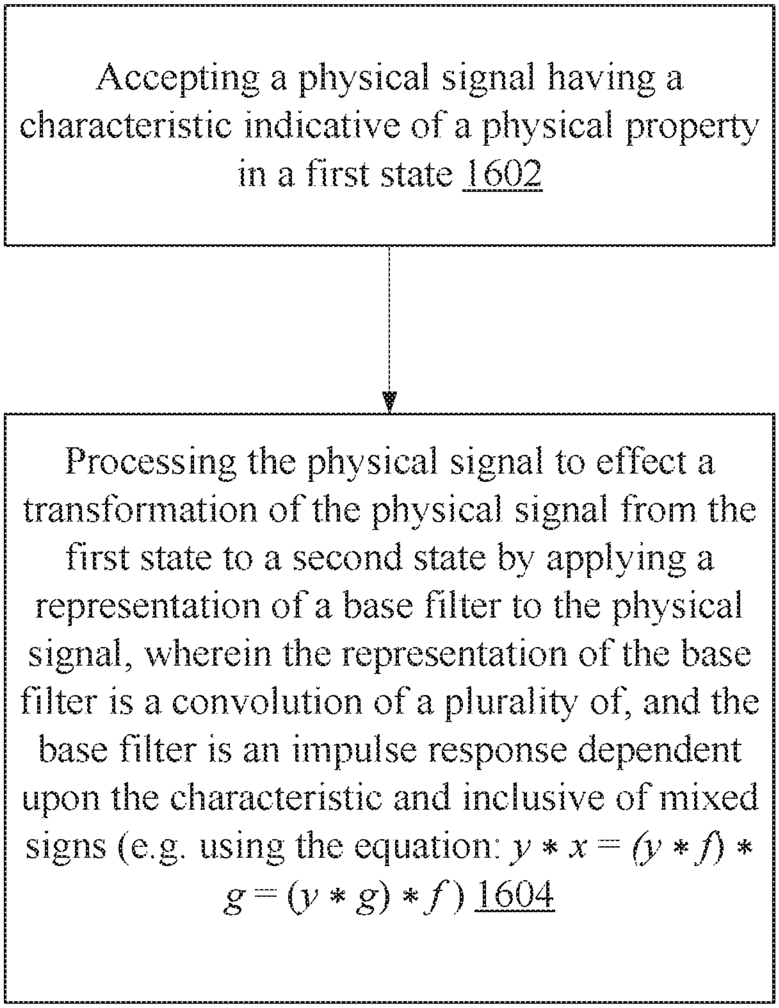
FIG. 16 shows a method of processing a physical signal to effect a transformation of the physical signal using methods and systems described herein.

A modified semi-NMF algorithm for Toeplitz constrained matrices has been presented here. The factorization decomposed a collection of HRIRs into convolutions between a common resonance filter and a collection of reflection filters. Resonance filters were direction-independent and shown to correlate with anthropometry. Reflection filters were direction-dependent and composed of non-negative entries whose sparsity and reconstruction error could be tuned via an $L_1$-NNLS solver under window and convolution transformations of various bandwidths. The reconstructed HRIRs from the decomposition can be compared to $L_1$-LS reference solutions where the former had a better sparsity to SD error trade-off necessary for both efficient and accurate direct convolution. In short, the decomposed filters described here may be useful for predicting HRIRs from anthropometry, a problem of current interest. The decomposed filters described herein can also be used to perform the method shown in FIG. 16. FIG. 16 shows a method having two steps. In a first step 1602, a CPU (such as the one shown in FIG. 3) can accept a physical signal having a characteristic indicative of a physical property in a first state. In a second step 1604, the CPU can 1602 process the physical signal to effect a transformation of the physical signal from the first state to a second state by applying a representation of a base filter to the physical signal, wherein the representation of the base filter is a convolution of a plurality of, and the base filter is an impulse response dependent upon the characteristic and inclusive of mixed signs (e.g. using Equation 2).

Algorithm 1, shown below, factorizes input HRIR matrix X into Toeplitz matrix $\tilde{F}$ and sparse and non-negative reflections G.

[Algorithm 1: Modified Semi-NMF for Toeplitz Constraints]

```
Require: Filter Length K, transformation matrix D ∈ ℝ^(M*×M),
HRIR matrix X ∈ ℝ^(M×N), max-iterations T
1: G ← rand(N,K)        \\ Randomize reflections
2: for t = 1 to T do
3:     Θ ← A^(-1)b       \\ Solve for resonance via equations 14, 12
4:     F̃ ← Top(Θ)        \\ Form Toeplitz matrix in equations 6, 18
5:     Update G          \\ Element-wise multiplicative update via
equation 15 or NNLS solutions via equation 20
```

-continued

| [Algorithm 1: Modified Semi-NMF for Toeplitz Constraints] | | |
|---|---|---|
| 6: | end for | |
| 7: | Fine-tune G. | \\ Adjust λ in equation 22 for varying sparsity |
| 8: | return $\tilde{F}$,G | |

While this disclosure includes what is presently considered to be the most practical and preferred embodiments, it is to be understood that the disclosure is not to be limited to the disclosed embodiments but, on the contrary, is intended to cover various modifications and equivalent arrangements.

What is claimed is:

1. A method of signal processing, comprising:

accepting a physical signal having a characteristic indicative of a physical property in a first state; and processing the physical signal to effect a transformation of the physical signal from the first state to a second state by applying a representation of a base filter to the physical signal;

wherein the representation of the base filter is a convolution of a plurality of filters, and the base filter is an impulse response dependent upon the characteristic and inclusive of mixed signs.

2. The method of claim 1, wherein the characteristic is a direction associated with a location of an origin of the physical signal.

3. The method of claim 2, wherein the impulse response is one of a plurality of head-related impulse responses parameterized by one of the location and the direction.

4. The method of claim 1, wherein the convolution includes approximate decomposition of the characteristic-dependent, mixed-sign base filter into a characteristic-independent, mixed-sign filter represented as a mixed-sign, Toeplitz-structured matrix and a characteristic-dependent, non-negative filter represented as a non-negative matrix.

5. The method of claim 4, wherein the non-negative matrix is made sparse.

6. The method of claim 5, wherein the sparsity of the non-negative matrix is tuned using a non-negative least squares solver to achieve a target approximation error.

7. The method of claim 6, wherein the approximation error is one of a root-mean square error and a spectral distortion.

* * * * *